Patented Feb. 4, 1947

2,415,381

UNITED STATES PATENT OFFICE 2,415,381

HYDROPHILIC COLLOID COLOR FORMERS AND PHOTOGRAPHIC ELEMENTS CONTAINING THE SAME

David W. Woodward, Wilmington, Del., assignor to E. I. du Pont de Nemours & Company, Wilmington, Del., a corporation of Delaware No Drawing. Application March 31, 1944, Serial No. 528,946

5 Claims. (Cl. 95—7)

This invention relates to colloid dye intermediates. More particularly, it relates to hydrophilic polymeric colloid dye intermediates which are useful in processes of color photography. Still more particularly, the invention relates to ethers of hydrolyzed olefin/vinyl ester interpolymers wherein the components attached by an ether linkage to the polymer chain contain dye intermediate nuclei. The invention also relates to photographic color-yielding compositions and layers which comprise such polymeric dye intermediates. The invention further relates to processes of forming colored images in photographic elements containing such layers.

An object of this invention is to provide new and useful polymeric dye intermediates. A further object is to provide photographic elements with hydrophilic layers composed of dye intermediates capable of color coupling. A still further object is to provide such materials which can be used alone as dispersing and binding agents for light-sensitive silver salts. Another object is to provide a new class of photographic elements which have a high sensitivity for use in chromogenic processes. Yet another object is to provide such multilayer elements which will faithfully reproduce scenes in their natural colors with complete clarity and excellent definition. A further object is to provide photographic elements which have good speed and supply a high degree of dye intermediate concentration which yields a maximum color density per molecule of silver halide reduced on development.

The above objects can be attained by the preparation and use of dye intermediate ethers of hydrolyzed terminally unsaturated monoolefin/vinyl ester interpolymers in photographic elements utilizing light-sensitive silver salts and in color coupling development processes of photography. The ethers have two chemically joined components, one of which consists of a polymer chain and the other consists of a plurality of dye intermediate components having the general formula R—A— wherein R is a group containing a dye-forming nucleus and A is a divalent saturated aliphatic nucleus whose free valence stems from a methylene or substituted methylene group and is linked through an ether oxygen atom to a carbon atom of the polymer chain. In the resulting products, the dye intermediate nuclei are an integral part of the polymer molecule, i. e., the products are chemical entities and not physical mixtures of polymers and simple monomeric dye intermediates and hence there is no difficulty arising from differences in solubilities and compatibilities of the components.

These hydrophilic dye intermediate ethers can be prepared by etherification of the hydrolyzed olefin/vinyl ester interpolymers with dye intermediate components containing a reactive group attached to a non-aromatic hydrocarbon group e. g., a methylene group. Such reactive groups are hydroxyl or halogen, e. g., chlorine, bromine and iodine. Alternatively, the dye intermediate component can be joined by use of a bifunctional connecting agent such as an aldehyde, e. g., acetaldehyde, benzaldehyde, formaldehyde or materials which release formaldehyde or react like formaldehyde. The dye intermediate components are added in such amounts that a plurality of ether groups are present in each molecule of the final hydrophilic dye intermediate polymer.

By dye intermediates or color-formers are meant nuclei containing groups which are capable of coupling with the oxidation products of color coupling aromatic primary amino developing agents formed on development of silver salts images to form a quinoneimine (including indamine, indoaniline and indophenol) dye or an azomethine dye. These dye intermediate nuclei are also capable of coupling with diazotized aromatic amines to form azo dyes.

Nuclei of the above type are well known in the dye art and color photography art. They are sometimes called color-formers, coupling components, etc.

These dye intermediate nuclei have as the active coupling groups a structure which may be represented as

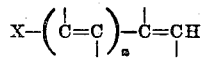

wherein X is HO or RHN, where R is hydrogen or an alkyl radical, which may be substituted, e. g., methyl, ethyl, hydroxyethyl, beta-chlorethyl, benzyl, dodecyl, etc., and $n$ is 0 or 1. This group is found in the reactive methylene dye intermediates and in aromatic hydroxyl and amino compounds and includes the reactive ethenol, aminoethenyl, 4-hydroxy- and 4-amino-1,3-butadienyl groups. These groups occur in phenols, naphthols, anilines, naphthylamines, acylacetamides, cyanoacetamides, beta-ketoesters, pyrazolones, homophthalimides, coumaranones, indoxyls, thioindoxyls, etc.

The reactive ethenol group represented by

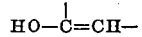

occurs in phenols and naphthols which couple in the ortho position and in the alkali soluble or enol form of most reactive methylene dye intermediates. These reactive methylene groups have a hydrogen rendered mobile by the proximity of certain unsaturated groups such as for example

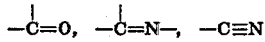

and others. The —CH$_2$— group is usually present between two such groups, for example

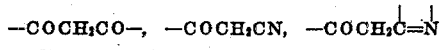

in a cyclic or acyclic system.

The reactive aminoethenyl group

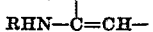

occurs in aromatic amino compounds which couple in the ortho position.

The 4-hydroxy- and 4-amino-1,3-butadienyl groups represented as

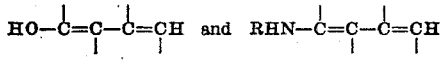

occur in phenolic, naphtholic and aromatic amino compounds which couple in the para position.

In all of these dye intermediate groups the hydrogen atoms in the coupling reactive position may be replaced by groups readily eliminated in the coupling reaction, e. g., halogen, sulfonic acid, carboxylic acid, etc.

The preferred compounds are color-forming ethers of hydrolyzed ethylene/vinyl acetate interpolymers of a mol ratio of 0.2 to 0.02 of ethylene to one of vinyl acetate, in which the color-former nuclei are joined to the interpolymer chain through a —CH$_2$O— group. These compounds can be advantageously prepared by reacting formaldehyde or a formaldehyde-yielding material in a solution or suspension of the hydrolyzed ethylene/vinyl acetate interpolymer and color former in the presence of a condensation catalyst. The reaction may be carried out simultaneously or stepwise. For example, formaldehyde may be reacted with the resulting hydroxyl polymers to form a methylol derivative which may then be condensed with the color-forming compound or preferably the formaldehyde may be condensed with the color-forming compound and the resulting methylol derivative condensed with the aforesaid hydroxyl polymers. The resulting compounds may be represented by the general formula:

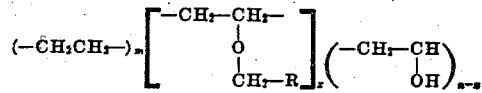

wherein the carbon atoms of the respective units form a chain of carbon atoms in the polymeric molecule, R is a dye intermediate nucleus as previously defined, $n$ is at least 100, $m$ is not more than $0.2n$ and $x$ is $1/100n$ to $3/10n$.

In the previous formula the chain nucleus is that obtained from the hydrolysis products from the ethylene/vinyl acetate interpolymers. The hydrolysis products are substantially free from acetate groups and have the formula

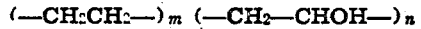

in which $n$ is at least 100 and $m$ is less than $0.2n$.

Hydroxyl polymers suitable for use in preparing the novel hydrophilic polymeric dye intermediate ethers of this invention may be made from the polymers described in copending application Serial No. 446,116, filed June 6, 1942. They are obtained by the interpolymerization of vinyl esters and ethylene to yield an interpolymer having less than 0.2 mol of olefin to 1 vinyl ester, followed by partial or complete hydrolysis.

Hydrolysis or alcoholysis of the ethylene/vinyl ester interpolymers is preferably carried out by dissolving the interpolymer in an alcohol such as methanol or ethanol, or in a mixture of an alcohol and a hydrocarbon such as toluene, and then treating with a suitable hydrolyzing agent or catalyst such as alkali, e. g., NaOH, KOH, or mineral acid, e. g., HCl, H$_2$SO$_4$ etc. The hydrolysis may be partial or complete, depending on the nature of the solvent, the amount and kind of catalyst used, and the time and temperature of reaction. The following general principles apply: (1) the greater the amount of vinyl ester in the interpolymer, the more rapid the rate of hydrolysis; (2) alkaline hydrolyzing agents give more rapid rates of hydrolysis than mineral acid catalysts.

The term "hydrolysis" as used herein and in the accompanying claims is intended to include alcoholysis as well as hydrolysis with the use of water. Regardless of whether water or an alcohol is used to split off the ester groups in the interpolymer, the product is the same.

Complete hydrolysis can be obtained in most cases by dissolving the interpolymer in alcohol or alcohol-toluene to give about a 10% solution, adding an excess of sodium or potassium hydroxide in alcohol and refluxing for about one hour.

The interpolymers containing (CH$_2$)$_n$ where $n=2$ to 4 groups attached to —CH$_2$—CHOH— groups, may be modified, if desired, by further reaction to introduce minor portions of other groups, e. g., acetal, ester, ether groups, etc. However, all of the products useful in preparing the color-forming ethers of the present invention have the group —CH$_2$CHOH— representing at least 50% of the polymer chain, i. e., for every 100 chain atoms there are at least 25 hydroxyl groups. Further, it is preferred that the final color-forming ethers themselves contain at least 12.5 hydroxyl groups for every 100 chain atoms, and that the polymer consists of at least 25% (—CH$_2$CHOH—) groups so that they will have the desired permeability-solubility characteristics as herein defined. It is also preferred that between 1 and 30 color-forming ether groups shall be present for each 100 chain atoms. The color-forming compounds are highly polymeric (by this is meant having a polymer chain in excess of 200 carbon atoms) and strong unsupported films may be formed from them. They have a high softening point. The preferred dye intermediate polymeric ethers are not dissolved by cold water (20° C.) but are soluble to the extent of at least 5 parts in 100 parts of boiling water or a boiling mixture of water containing not more than 50% of a water-miscible organic solvent, and preferably not more than 25% of ethanol.

The above limitations enable the compounds to fulfill the rigorous physical demands required of dispersing and binding agents used in preparing light-sensitive silver salt layers in photographic elements. The novel hydrophilic polymeric color formers possess a unique combination of properties among which may be mentioned (1) ability to form a strong coherent unsupported film, (2) ready permeability to water and photographic processing solutions at temperatures in the neighborhood of 20° C., (3) insolubility and freedom from softening in water at moderate temperatures, (4) transparency and freedom from color, (5) adequate solubility in satisfactory solvents for coating, (6) freedom from adverse action on sensitive silver salts, (7) a relatively high softening point, (8) ability to disperse, prevent coagulation, and sedimentation of silver salts.

The hydrophilic polymeric ether color formers of the present invention, when associated with light-sensitive silver halides, combine not only the above properties but, in addition, function as chromogens. In fact, the number of color-coupling groups in the polymer can be controlled so as to contribute not only adequate color-forming capacity but also a portion of the desired solubility/permeability balance required for a satisfactory carrier for the light-sensitive material.

The introduction of dye intermediate ether groups in controlled amounts usually reduces the water solubility somewhat. However, if the color-forming group contains a solubilizing group, the solubility of the final product may be increased slightly. It is often satisfactory merely to balance the dye intermediate ether groups and hydroxyl groups in the correct ratio to obtain the ideal permeability and film properties. If in any one polymer the color-former substitution which gives the optimum color on chromogenic development does not yield the desired solubility, this is corrected by the introduction of other groups such as acetal, ether or ester groups designed to have the proper solubilizing or insolubilizing effect. For instance, acetal formation with benzaldehyde decreases water solubility while with o-sulfobenzaldehyde water solubility is increased.

Color-yielding photographic compositions can be made by dissolving the novel hydrophilic polymeric ether color formers in a solvent, e. g., water containing 30% or less of a water miscible solvent, e. g., methyl alcohol or ethyl alcohol. A water-soluble inorganic halide is incorporated in the solution and a solution of a water soluble silver salt, e. g., silver nitrate, added. Silver halides are precipitated in the hydrophilic polymeric color-former. The resulting raw emulsion can be further treated, e. g., coagulated, washed, ripened, freed from excess soluble salts, digested or modified by the addition of sensitizers, antifogging agents, preservatives, hardeners and/or other emulsion constituents and then coated onto a suitable support, e. g., paper, metal, glass, or a transparent cellulose derivative film or a synthetic resin, e. g., polyvinyl acetal, or synthetic superpolymer, e. g., nylon, etc., or onto a colloid layer on such supports. After drying, the resulting element can be exposed and processed in the same way that a film element containing gelatin-silver halide color-former layers can be processed.

The invention will be further illustrated but is not intended to be limited by the following examples wherein light which will cause exposure or fogging is excluded from all preparations and coatings involving light-sensitive silver salts, all parts are by weight, all solutions aqueous and all temperatures centigrade unless otherwise indicated.

*Example I*

A mixture of 100 parts of o-hydroxybenzyl alcohol, 100 parts of pulverized completely hydrolyzed ethylene/vinyl acetate polymer of mol ratio 0.07 of ethylene to 1.0 of vinyl acetate, 400 parts of dioxane and 2 parts of 85% phosphoric acid is stirred at 80° for 6 hours, then diluted with 1000 parts of acetone and filtered. The solid material is extracted for 12 hours with acetone, then dried to give 114 g. of a white, hydrophilic color-forming polymer having the following probable color unit structure:

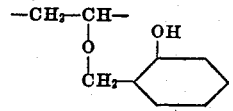

The gain in weight indicates a substitution of about 6% of the hydroxyl groups, i. e., about 10 out of every 100 chain atoms contains a color-forming group. Ten parts of this polymeric o-hydroxybenzyl ether is dissolved by stirring in 90 parts of 20% ethanol-water at 80° for one-half hour. To 40 parts of this solution is added 40 parts of water, 5 parts of 1% sodium dodecyl sulfate, and 5 parts of concentrated ammonia water. The mixture is stirred at 45° while adding 20 parts of 3N silver nitrate and 23 parts of 3N ammonium bromide—0.1N potassium iodide, simultaneously during 5 minutes. After stirring a total of one-half hour at 45°, the silver halide dispersion is allowed to cool and mixed with 100 parts of acetone which precipitates the binding agent containing the dispersed light-sensitive silver halides. The precipitated polymer mass is washed for one hour in running water to remove the soluble salts, then the remaining 60 parts of the original polymer solution is added, together with 25 parts of ethanol and 1 part of 10% potassium bromide and the whole mixture stirred at 58° C. for one-half hour after which it can be used directly or stored. This light-sensitive solution is coated both on baryta coated paper and cellulose acetate film base and exposed to an object. It is then developed in the following solution:

| | Parts |
|---|---|
| p-Aminodiethylaniline hydrochloride | 2 |
| Sodium sulfite | 3 |
| Sodium carbonate | 20 |
| Water to make | 1,000 | made by dissolving the constituents in 500 parts of water and diluting the solution to 1000 parts washed, bleached in 4% potassium ferricyanide and fixed in 25% sodium thiosulfate solution. The resulting film and paper contain a strong blue-green negative image.

*Example II*

A solution of 200 parts of phenol and 400 parts of 20% sodium hydroxide is cooled to 15° and mixed with 60 parts of 37% formalin solution and let stand at 25° for 60 hours. The solution is then almost neutralized by adding 100 parts of concentrated sulfuric acid the mixture being kept at 20° by addition of ice. The phenolic compounds are separated from the aqueous fraction by extraction with ether. The ether extracts after washing and drying are evaporated under reduced pressure at 20° and added to a mixture of 100 parts of hydrolyzed ethylene/vinyl acetate polymer of mol ratio about 0.05 of ethylene to 1 of vinyl acetate and 300 parts of dioxane containing 5 parts of 85% phosphoric acid. The mixture is stirred for six hours at 80° diluted with 1000 parts of acetone, filtered and extracted with acetone for 12 hours to yield 120 parts of a white powder soluble in boiling 10–50% ethanol. This product is an o-hydroxybenzyl ether of the same general structure as the product of Example I and a solution is prepared by stirring 10 parts of this material in 90 parts of 20% ethanol at 80° for one hour. To 40 parts of this solution is added 40 parts of water, and 25 parts of 3N ammonium bromide 0.1N potassium iodide as in Example I. The mixture is stirred at 45° while adding 10 parts of ammoniacal 3N silver nitrate, then after stirring 15 minutes at 45°, 10 parts of 3N silver nitrate is added and the mixture stirred at 45° for 15 minutes. The dispersion is then cooled to 30° and precipitated by adding 300 parts of 5% sodium sulfate solution. The precipitated light-sensitive composition is washed for 1 hour in running water, then the remaining 60 parts of the original polymer solution is added together with 10 parts of ethanol and 1 part of 10% potassium bromide and the whole mixture stirred at 60° for ½ hour. The product is then coated on cellulose nitrate film base which is exposed and processed as in Example I to yield similar results.

Example III

A mixture of 15 parts of hydrolyzed ethylene/vinyl acetate interpolymer of about 3 to 4% ethylene content by weight, 30 parts of 2-hydroxy-3-methyl-5-chlorobenzyl alcohol (prepared from formaldehyde and p-chloro-o-cresol) 80 parts of dioxane and 2 parts of 85% phosphoric acid are stirred at 80° for 2 hours then 5 parts of acetic anhydride is added and the stirring continued for 1 hour at 80°. The product, a polymeric 2-hydroxy-3-methyl-5-chlorobenzyl ether, is washed and extracted with acetone and dried. A silver halide emulsion is prepared, coated on cellulose acetate film base, exposed and processed as in Example I. The resulting film contains a brilliant blue-green negative dye image.

Example IV

In a preparation similar to that recorded under Example II, 250 parts of o-phenylphenol is used in place of the phenol. Ten parts of the resulting white polymer, a 5% substituted 2-hydroxy-3-phenylbenzyl ether of the hydrolyzed ethylene/vinyl acetate polymer is dissolved in a mixture of 50 parts of water and 50 parts of ethanol at 80°. This solution is used in the preparation of an emulsion by the method of Example I. The resulting light-sensitive composition is coated on a white photographic paper which is exposed and processed as in Example I to yield a bright greenish-blue negative dye image.

Example V

A mixture of 42 parts of alpha-naphthol, 105 parts of dioxane, 1 part of 85% phosphoric acid, 5 parts of decolorizing charcoal and a small amount of sulfur dioxide is boiled and filtered, then mixed with 22 parts of hydrolyzed ethylene/vinyl acetate interpolymer containing about 5% ethylene by weight, 20 parts o-sulfobenzaldehyde, 1 part of 85% phosphoric acid, 50 parts of dioxane, and stirred for one-half hour at 70°. Then 7.5 parts of paraformaldehyde is added, and stirring at 70° is continued for two hours. The mixture is then diluted with 500 parts of acetone, filtered and extracted with acetone. The product is a mixed (1-hydroxy-2-naphthyl) methyl ether/benzaldehyde-o-sulfonic acid acetal of a hydrolyzed ethylene/vinyl acetate interpolymer. This material is used as in Example II in the preparation of a light-sensitive coating composition. After coating this material on cellulose acetate film base and processing as in Example I, bright blue negative dye images are obtained.

Example VI

A mixture of 22 parts of hydrolyzed ethylene/vinyl acetate polymer of the type specified in Example V, 30 parts of o-sulfobenzaldehyde, 100 parts of dioxane, and 2 parts of 85% phosphoric acid was stirred at 80° for ½ hour. Then a mixture of 45 parts of phenylmethylpyrazolone and 7 parts of paraformaldehyde preheated to 70° is added and the mixture stirred for 2 hours at 75°, then washed with acetone and extracted. The resulting light tan powder, namely, the mixed (3-methyl-1-phenyl-5-pyrazolon - 5 - yl) methyl ether/benzaldehyde-o-sulfonic acid acetal of hydrolyzed ethylene/vinyl acetate interpolymer, is soluble in hot 20% ethanol. A light-sensitive composition is prepared and coated as in Example I and after exposure and processing the coated paper and films according to that example, brilliant magenta negative dye images are obtained.

Example VII

A mixture of 56 parts of o-chloroacetoacetanilide, 50 parts of 37% formalin solution, 100 parts of 50% alcohol, and 2 parts of concentrated hydrochloric acid is warmed together at 50° for one hour, cooled, diluted with water, decanted, washed with water, and dried, and dissolved in 200 parts of dioxane. To this solution is added 22 parts of hydrolyzed ethylene/vinyl acetate polymer of about 3% ethylene content by weight and 2 parts of phosphoric acid and the mixture stirred at 80° for two hours. The product, a polymeric ether of the following probable color unit structure:

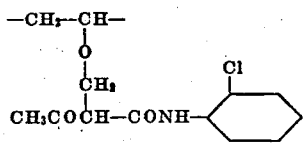

is washed and extracted with acetone and dried to give 25.5 parts of a white powder soluble in boiling water. This material when used in place of the polymeric color former of Example I yields yellow dye images.

Example VIII

A solution of 25 parts of methyl chloromethyl ether in 60 parts of dioxane is added slowly to a suspension of 40 parts of sodium acetoacetanilide in 150 parts of dioxane. The mixture is stirred 15 minutes and filtered. The filtrate is diluted with 750 parts of water and allowed to stand for one hour. The precipitate is filtered, washed with water, dried, dissolved in 25 parts of dioxane, and added to a mixture of 22 parts of hydrolyzed ethylene/vinyl acetate polymer of the type specified in Example VII, 125 parts of dioxane, and 1 part of 85% phosphoric acid. The mixture is stirred at 80° for six hours, diluted with acetone, filtered, and extracted with acetone. This polymer is similar in structure to that of Example VII and when used in place of the polymer of Example I yields negative yellow dye images.

Example IX

A mixture of 28 parts of N-phenylacetoacetanilide, 3 parts of paraformaldehyde, 135 parts of dioxane is heated at 80° for one hour, then diluted with 300 cc. of water and extracted twice with ether. The ether solution is dried, filtered, and evaporated to about 25 parts, then dissolved in 50 parts of dioxane. This dioxane solution is added to a mixture of 20 parts of hydrolyzed ethylene/vinyl acetate polymer of mol ratio about 0.07 of ethylene to 1 of vinyl acetate, 1 part of 85% phosphoric acid, and 150 parts of dioxane. The mixture is heated three hours at 75–80°, washed several times with acetone, and extracted. This material, a partially substituted polymeric ether containing the following probable color unit structure

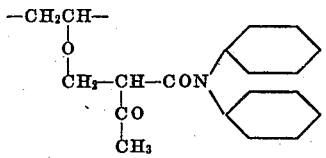

when used in place of the polymeric color former of Example I produces a yellow negative dye image.

Example X

One hundred parts of a fast gelatin-silver iodobromide emulsion is melted at 40°, and diluted with 400 parts of distilled water. This diluted emulsion is spun in a centrifuge until the silver halide has separated from the aqueous gelatin solution. After washing with warm water 10 parts of this moist silver halide is dispersed in a solution of 10 parts of the polymeric color former of Example I dissolved in 150 parts of 20% ethanol-water. The resulting fast light-sensitive color-forming dispersion is coated on a cellulose nitrate base exposed to an object and processed as in Example I to yield a negative blue-green dye image.

Example XI

The light-sensitive coated films of the above examples are exposed and developed in a noncolor-coupling photographic developer, of the following composition:

| | Parts |
|---|---|
| Water | 975 |
| N-Methyl-p-aminophenol sulfate | 2.5 |
| Sodium sulfite (anhydrous) | 75.0 |
| Hydroquinone | 3.0 |
| Sodium carbonate (anhydrous) | 30.0 |
| Potassium bromide | 5.0 | washed, reexposed or chemically fogged, then exposed and developed as the film in Example I, whereupon positive color images of the same color are obtained.

Example XII

A monopack suitable for natural color reproduction is prepared by coating in order on a cellulose acetate film base the following compositions: The light-sensitive material of Example I which has been sensitized to the red region of the spectrum but not the green by a green-blind red sensitizer, e. g., N.N'diethylnaphthiocarbocyanine iodide. Over this is coated the light-sensitive composition of Example VI which has been sensitized to the green region with a sensitizing dye, e. g., erythrosin. Over this last mentioned layer is coated a layer of hydrolyzed ethylene/vinyl acetate polymer of mol ratio 0.1 of ethylene to 1 of vinyl acetate containing a removable yellow filter dye to absorb blue light, e. g., tartrazine CI-640. Above this yellow filter layer is coated the blue-sensitive composition of Example VII. This film element is exposed to a colored object scene whereby latent images representing different color component aspects in the different layers are formed. The film is then processed by the following steps:

1. Develop 10 minutes in an ordinary noncolor forming developer of Example XI.
2. Wash 10 minutes.
3. Reexpose to white light and reduce the residual silver salt by treatment for 15 minutes in the dye generating developer of Example I.
4. Wash 10 minutes.
5. Bleach 7 minutes in a solution containing 3.5% potassium ferricyanide and made alkaline with ammonium hydroxide or sodium carbonate.
6. Rinse.
7. Remove bleached silver in a 25% solution of hypo (crystalline sodium thiosulfate).
8. Wash 15 minutes and dry.

The colored photograph resulting from the above process is of exceptional clarity and brilliance. The definition is considerably greater than that obtained by use of previously known films.

Example XIII

A cellulose nitrate base is coated with the light-sensitive coating of Example III which has been sensitized to red light but not green by means of a green-blind sensitizing dye, e. g., pinacyanol. After drying, a layer of hydrolyzed ethylene/vinyl acetate polymer of mol ratio 0.1 of ethylene to 1 of vinyl acetate is coated on top of the emulsion, then dried, and the light-sensitive composition of Example VI which has been orthochromatized is coated and dried. Next is coated a non color-forming layer as above containing a yellow (minus blue) filtering material, e. g., titanium ferrocyanide or N-octadecyl alpha (4-piperonyl-butadienyl) pyridinium stearyl bromide (U. S. P. 2,255,077). Over this is coated the light-sensitive composition of Example IX. The resulting film is exposed to a colored object and treated by the development method of Example I to form a color negative in which all of the colors of the object scene are reproduced in their complementary color. This color negative is then printed onto an unexposed film of the same material using successive exposures of blue, green, and red light which are substantially complementary to the color of the dyes generated in the layers and, after processing by the method of Example I, a color positive is obtained.

Example XIV

A heavy white paper having a baryta coating is coated as is the film of Example XII. The multilayer element is exposed under a color positive prepared as in Example XII and processed by the same means to a color positive. A piece of this same paper is used in place of the film of Example XIII as a printing stock and yields a color positive having clear bright colors of good definition and freedom from stain.

Example XV

A film prepared according to Example I is exposed and developed in the developer of Example I. After development the film is washed and placed in a diazo solution prepared as follows: 1.73 parts of 2-chloro-4-nitro-aniline dissolved in 5 parts of concentrated sulfuric acid is mixed with 0.7 part of sodium nitrate dissolved in 5 parts of concentrated sulfuric acid, and, after thoroughly mixing, the solution is poured with rapid stirring into a mixture of 600 parts of water and 400 parts of ice. Following this, 15 parts of sodium acetate and 7 parts of calcium hydroxide are added and the solution filtered at 0–5°. After two minutes in this solution, the film is placed in 1 molar hydrochloric acid at 5° for five minutes to wash out the excess of diazonium compound. The silver and developer coupling products are bleached by immersion for ten minutes at 15° in an aqueous solution containing 10% copper sulfate, 5% potassium bromide, and 5% concentrated hydrochloric acid. After washing, the film is fixed in a standard potassium alumthiosulfate bath, washed, and dried to give a film containing a positive image in a brilliant yellow azo dye.

*Example XVI*

A film prepared according to Example III is exposed to an object, developed in a developer of the type described in Example XII, washed, and dried. After re-exposure to white light, the film is developed in a solution containing 6 parts of water, 5 parts of 2% sodium oleate, 2 parts of phenylhydrazine, and 2 parts of sodium carbonate. The developed film, after washing, is bleached in 4% potassium ferricyanide and fixed. The film then contains a brilliant yellow positive azo dye image.

*Example XVII*

A mixture of 115 parts of 1-N-beta-hydroxyethylaminonaphthalene-6-sulfonic acid, 15 parts of paraformaldehyde and 5 parts of 85% phosphoric acid is stirred at 60° for two hours in a solution of 500 parts of dioxane and 200 parts of water. Then 200 parts of 95% hydrolyzed ethylene/vinyl acetate interpolymer of mol ratio 0.05 of ethylene to one of vinyl acetate is added and the mixture stirred at 75° for six hours. The resulting mixture is diluted with 1000 parts of ethanol, filtered and washed in six changes of 80% ethanol of 2000 parts each during twelve hours, filtered and dried. Ten parts of the resulting polyhydroxyalkyl ether of the hydroxyethylaminonaphthalene sulfonic acid is used in preparing a light-sensitive coating by the method of Example I. When the resulting element is processed by the method of either Example XV or XVI, a brilliant positive magenta azo dye image is obtained.

*Example XVIII*

A mixture of 171 parts of p-nitrobenzylchloride, 230 parts of pulverized completely hydrolyzed ethylene/vinyl acetate polymer having an ethylene content of 5% and a viscosity of 20 centipoises at 20° when dissolved in 90/10 water/ethanol to form a 10% solution, 150 parts of potassium carbonate and 1000 parts of dioxan is stirred at 75° for ten hours, then diluted with 1000 parts of ethanol and filtered. The solid is washed with 6 portions of 80% ethanol during twelve hours and dried to give a polyvinyl ether containing approximately 1 p-nitrobenzyl ether group for each 10 hydroxyl groups. A solution of 200 parts of this ether in 1000 parts of 20% dioxane is reduced with hydrogen using a platinum oxide catalyst. This solution, after removal of the catalyst is stirred at 20° with 50 parts of diketene for twelve hours, then the product is precipitated by addition of 1000 parts of acetone followed by washing with three changes of 1000 parts of each of acetone during six hours. Ten parts of this polyvinyl alcohol containing p-acetoacetaminobenzyl ether groups is used in preparing a light-sensitive element according to the method of Example I. After exposure and processing according to that example, a yellow negative azomethine dye image is formed. Other elements prepared in the same way are processed by the methods of Examples XV, XVI to yield positive yellow azo dye images.

In place of any of the specific hydrophilic color-forming ethers employed in the above examples there may be used other color-coupling ethers of hydrolyzed olefin/vinyl esters which have similar physical properties. Since different color-forming groups have different effects on the solubility and permeability, it is often necessary, in order to secure the desired properties, to employ hydrophilic hydrolyzed olefin/vinyl esters of different viscosities and different solubilities. If a product is obtained which is too soluble, a higher viscosity material or one containing more olefin may be used, but if the color-forming polymer is slightly too insoluble or impermeable, a lower viscosity polymer or one containing less olefin should be employed. Other useful methods of controlling the solubility and permeability include the substitution of a part of the hydroxyl groups of the hydrolyzed olefin/vinyl esters with, for instance, ester, acetal, or ether groups. The presence of a minor portion of acetate groups increases the water solubility while larger amounts decrease the water solubility. Acetal groups decrease water solubility and increase the solubility in organic solvents or solvent-water mixtures. To secure a greater insolubilizing effect, a small percentage of aromatic ester or acetal groups may be introduced. For example, if the final color-forming binding agent is too soluble, one of the following derivatives can be employed: An ethylene/vinyl acetate interpolymer of 0.05 to 0.2 mol ratio, (1) 60 to 75% hydrolyzed, (2) 100% hydrolyzed which has been not more than 20% acetalized with butyraldehyde, (3) 100% hydrolyzed followed by 10% or less esterification with benzoic acid, (4) 100% hydrolyzed and approximately 5% acetalized with benzaldehyde or (5) completely hydrolyzed followed by esterification with not more than 10% butyric ester groups. Such substitution can, of course, be introduced prior or subsequent to condensation of the color former with the interpolymer. If, on the other hand, a greater solubilizing effect is desired, acidic salt-forming groups, e. g., sulfonic or carboxylic acid groups can be introduced either on the color-forming nucleus or by acetal formation with aldehyde acids, by partial esterification with dibasic acids or by ether formation with hydroxyacids, etc. For example, if the color-forming binding agent is too low in solubility one of the following derivatives can be employed: (1) a completely hydrolyzed ethylene/vinyl acetate interpolymer of 0.02 to 0.1 mol ratio of ethylene to 1 of vinyl acetate up 20% acetalized with phthalaldehydic acid, benzaldehyde ortho-sulfonic acid, glyoxylic acid, etc., (2) having on 20% or less of the hydroxyl group half esters of phthalic, succinic, etc., acids, (3) 20% or less etherified with glycolic acid. Such groups also can be introduced either before or after condensation of the color former with the polymer.

The preferred reaction for preparing these new color-forming binding agents involves ether formation through formaldehyde to give a compound having each of the color-forming nuclei attached through a methylene group to an ether oxygen which is in turn attached to a carbon of the linear carbon chain of the polymer.

The color-forming nuclei need not, however, be attached directly to the methylene ether group. Non-color-forming formaldehyde reactive groups, e. g., amide, mercapto, or aliphatic amino or hydroxyl may be present in the dye former and react with the formaldehyde to form methylol derivatives capable of condensing with the hydroxyl groups of the polymer to form ethers.

Alternatively, other etherification methods may be employed. In all of these compounds a bifunctional non-color-coupling radical may intervene between the ether methylene groups and the color coupling nuclei.

Thus, the color-forming nuclei can be joined to the polymer chain through other ether groups such as —OCH$_2$COX, —OCH$_2$CH$_2$X, —OCHRX, —OCR$_2$X, —OCH$_2$CH$_2$SX

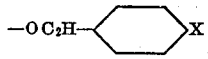

—OCH$_2$OCH$_2$COX, —OCH$_2$CHOHCH$_2$OX
—OCH$_2$OCH$_2$X, —OCH$_2$CH$_2$NHX
—OCH$_2$CHOHCH$_2$NHX, etc., wherein the R groups are hydrogen or small alkyl radicals and X is a color-forming group as herein described by the following representative methods: (1) the hydrolyzed olefin/vinyl ester interpolymer is stirred or milled with 10 to 20% aqueous sodium hydroxide and a color-former containing an aliphatic chloride, bromide or iodide group is added and the mixture stirred and warmed to split out hydrogen halide from the reactants thus connecting the color-forming nuclei to the polymer chain through an ether linkage, (2) a partial glycolic acid ether is formed by reaction of the hydrophilic polymer with chloroacetic acid and sodium hydroxide after which the carboxylic acid groups are converted to amides by reaction with color-forming compounds containing amino groups or (3) by reduction of nitrobenzyl ethers of hydrolyzed olefin/vinyl ester interpolymers followed by reaction with color-former acid chlorides.

In addition to the ether color-forming groups of the above examples, many of the other well-known color-coupling components may be employed. Thus, the dye intermediate nucleus may be any phenol, naphthol or aromatic amine having a coupling position available ortho or para to the aromatic hydroyl or amine group or any active methylene compound, i. e., a compound having a —CH$_2$— group activated by two unsaturated groups taken from the class of —$\overset{|}{C}$O, —$\overset{|}{C}$S, —C≡N, —NO$_2$, —C=N, —$\overset{|}{S}$O$_2$, —CONH—, —COOalkyl, —COOaryl, $\searrow\!\!\!\nearrow$N=C, connected either directly or through a conjugated system. Such active methylene compounds are distinguished by their ability to enolize in alkaline solution forming a soluble alkali metal salt and include many acyclic and heterocyclic compounds known in the art. Examples of such active methylene compounds include (1) beta-keto-acylamides of the type RCOCH$_2$CONHR'; where R is a hydrocarbon or heterocyclic radical and R' is preferably aromatic, e. g., benzoylacetanilide, furoylacetanilide, p-acetoacetamidobenzoic acid, naphthoylacetanilide, p - nitroacetoacetanilide, 2.5 dichloroacetoacetanilide, (2) pyrazolones, e. g., 1-p-carboxyphenyl - 3 - methyl-5-pyrazolone, 1-phenyl-3-carboxy-5-pyrazoline, 1-p-chlorophenyl-3-methyl-5-pyrazoline, 1 - m - sulfophenyl-3-phenyl-5-pyrazolone, (3) benzyl cyanides, e. g., p-nitrobenzylcyanide, (4) indoxyl and thioindoxyl, (5) homophthalimides, e. g., N-phenylhomophthalimide, N-beta naphthylhomophthalimide, N-dodecylhomophthalimide, (6) 2,4-dihydroxyquinoline, (7) diketohydrindene, (8) malonamides, e. g., N,N' diphenylmalonamide, ethyl N-phenylmalonamate, (9) phenacylpyridinium halides, (10) hydroxypyridines, (11) cyanacetanilide, (12) benzoylacetonitrile, (13) ethyl cyanoacetate, etc.

In the method of preparing these polymeric color-forming binding agents employing formaldehyde to connect the color-former to the polymer chain, the formaldehyde may be in any form. Thus, it can be used as solid paraformaldehyde or dissolved or suspended in water or solvents for the color former, or there may also be used formaldehyde-releasing compounds, such as trioxan, hexamethylenetetramine, methylene diacetate, or compounds capable of forming methylol derivatives, e. g., chloromethyl ether, etc.

Alternatively, dimethylol derivatives of amides, ureas, etc., e. g., dimethylolurea, dimethyloladipamide, dimethyloloxamide and their ethers such as bis-methoxymethylurea may be used in place of formaldehyde for linking the dye intermediates to the polymer chain.

The term "hydrophilic" as used in this application and claims, when referring to the dye intermediates, etc., is intended to denote compounds which in the form of thin layers, e. g., one to ten microns in thickness are insoluble in water at 20° C. but are freely water permeable.

The dye-coupling developing agent of Example I is only one in a large class of useful color-coupling developing agents. In general, they have an unsubstituted amino group or an aromatic nucleus ortho or para to a hydroxyl group or unsubstituted or substituted amino group. A number of specific color-developing agents which can be advantageously used are described in U. S. P. 2,297,732.

Multilayer films other than those described in the above examples may be prepared using the novel ethers of this invention. In a modified three-color photographic element the layer for recording red light and producing the blue-green part image may be sensitized to green and red light both and protected by a green-absorbing red filter layer between it and the exposure, or the sensitive layers may be coated in a different order, or one of these layers may be on the other side of the support. In addition, the color-coupling light-sensitive compositions hereof can be applied to a two-color process by suitable selection of dye intermediate nuclei and sensitizing compounds. Further, the invention can be combined with other processes for producing colored photographic images.

These new polymeric film-forming dye intermediates are also useful as adjacent layers in operative contact with non-color-forming layers containing silver salts. Thus, it has been found that a layer containing silver salts dispersed in a non-color-coupling binding agent, e. g., gelatin, etc., containing a latent or a silver salt image and having an adjacent coating of one of the color-forming polymeric ethers of the present invention may be processed as in Examples I, XI, XII, XV, XVI, above or by the other methods of color photography herein described to form colored images. Similarly, a multilayer film may be prepared and processed as in Example XII, using in place of each light-sensitive coating of that example a correspondingly color-sensitized layer of gelatin-silver halide emulsion and a layer of the color-forming polymer containing no silver salt. Although it has been proposed to do this with gelatin layers containing dispersed insoluble color formers, the new film-forming color formers of the present invention have advantages as herein discussed in color-forming strength, clarity, compatibility, film strength and stability, which make them greatly superior for such uses.

These new color-forming hydrophilic polymeric ethers are also useful in colloid silver halide emulsion layers. Thus, they may be dissolved in water or water-solvent mixtures and incorporated in gelatin-silver halide emulsions. The new color formers being themselves binding agents and highly polymeric do not, under these conditions, wash out of or migrate in the gelatin emulsion.

The preferred embodiment of the invention contemplates the use of color formers derived from interpolymers of vinyl acetate with less than 0.2 mol (less than 12% by weight) of ethylene per mol of vinyl acetate because of their superior film properties. However, other aliphatic terminally unsaturated mono-olefins also are useful in preparing the products of this invention. The limitation to aliphatic terminally unsaturated mono-olefins is made on the basis of ease of preparation of satisfactory polymers in good yield. Thus, the purely aliphatic olefins interpolymerize with vinyl esters in contrast to a non-aliphatic olefinic compound such as styrene which, as is well known, inhibits polymerization of the vinyl esters. Similarly, it has been found that the terminally unsaturated olefins enter into the copolymerization more readily than such olefins as butene-2, the terminal carbon atoms of which are saturated. Mono-olefins are utilized exclusively because it has been found difficult to obtain stable, soluble interpolymers from vinyl esters and di-or polyolefins. Because of their availability and because they have been found to enter into the copolymerization readily the aliphatic terminally unsaturated mono-olefins containing less than 5 carbon atoms are preferred. The interpolymers containing an olefin/vinyl ester mol ratio of 0.2 to 0.02 are best suited for use in preparing the products of this invention. When the olefin contains less than 5 carbon atoms this corresponds to an olefin content of 20% or less by weight. Any hydrolyzable polymerizable vinyl ester can be used as far as is known. The vinyl esters of the lower fatty acids such as vinyl acetate or vinyl propionate are preferred by virtue of their availability, ease of copolymerization and low cost.

An important advantage of the new film elements of this invention resides in the increased stability of the dye images formed. Another important advantage resides in the toughness of the light-sensitive layers. They are far superior to gelatin in this respect. Thus a gelatin-coated film when bent sharply between the thumb and forefinger with the gelatin side out, breaks in two. The elements hereof, on the other hand, can be folded repeatedly without breaking or cracking of the layer.

A further advantage resides in the fact that the color-yielding layers produce the maximum color density obtainable from the amount of silver salt reduced by the color-coupling developer. This admits of the saving of silver halides. The lower amount of silver halides is of major importance in multilayer films because the innermost layers receive light passing through layers intervening the source of light. The less silver halide the upper layers contain, the less scattering of light there is and the more light passes through to the lower layers. This results in films having a higher overall sensitivity and a higher degree of definition and resolution than is obtainable by the use of immobile color formers in gelatin layers.

Another improtant advantage lies in the fact that thinner coatings can be used. The layers are tougher than gelatin and have a higher concentration of silver salts than gelatin. Moreover, they are uniform and their sensitivity can be accurately controlled by adding carefully measured amounts of sensitizing agents. In addition, the light-sensitive color-yielding coating compositions hereof are more stable than gelatin emulsions, are resistant to bacterial putrefaction and can be stored longer.

The products of this invention have a wide utility in color photography. Not only may they be utilized as a direct taking stock in the color-development process as described in the above examples, but they are useful in duplicating or copying and making color prints on paper. Thus, the multilayer film of Example XII may be processed as in Example I to a color negative, then printed onto a similar film with white light or by exposure with blue, green, and red light controlled by suitable filters adjusted to the spectral qualities of the dyes and color sensitizers, and the printed material again processed as in Example I to a color positive. Thus, any number of color positives may be produced from a single color negative. Similarly, by using the procedure of Example XII on both the taking and printing stocks, color positives can be produced by reversal. In this way also, any number of color prints can be produced. The color negatives or positives produced according to this invention can also be employed in securing separation negatives or positives by known processes of color separation. The multilayer films such as described in Examples XII, XIII, and XIV can also be used as printing media by printing with suitable colored light from separation negatives or positives and proper processing as described above to yield color positives.

New film elements prepared according to this invention have broad utility in azo dye processing, providing that the proper dye-coupling nuclei are attached to the polymer chain. In U. S. P. 2,297,732 and application Serial No. 450,403, filed July 10, 1942, now United States Letters Patent 2,342,620, is described a method for producing azo dye images involving color development and azo dye-coupling steps. When the dye-coupling nuclei of that invention are attached to the hydrolyzed olefin/vinyl acetate polymers to prepare products of the present invention, the film elements prepared from them may be processed to pictures containing azo dye images of exceptionally good quality, stability, and clarity by the method described in the above-mentioned patent.

These latter film elements are also useful in other azo processes. Thus, they may be employed with the hydrazine developers of U. S. P. 2,220,929 and in the process of U. S. P. 2,339,213 whereby azo dyes are produced on color development with aromatic hydrazine reducing agents.

A film element of this latter type is also useful in the catalytic bleach process employing silver or silver salt images. Thus, the film after exposure and processing employing noncoupling developers to a film containing silver or silver salt images may be treated with a suitable diazonium compound to uniformly dye the layers in their appropriate colors. By use of the known catalytic bleach methods, this film may then be processed to a color negative or positive as desired.

In addition, these elements are useful in the known processes involving conversion of silver salt images to silver antidiazotate images followed by coupling to form azo dye images.

As many apparently widely different embodiments of this invention may be made without departing from the spirit and scope thereof, it is to be understood that the invention is not limited to the specific embodiments thereof except as defined in the appended claims.

What is claimed is:

1. A photographic element comprising a support having at least one light-sensitive layer comprising a hydrophilic ether of a hydrolyzed aliphatic monoolefin/vinyl ester interpolymer having a plurality of dye intermediate nuclei attached through ether linkages to the chain atoms of said interpolymer, said nuclei possessing a structure of the formula:

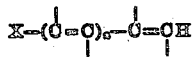

where X is a member of the group consisting of HO— and primary and secondary amino radicals and $n$ is a number from the group consisting of 0 and 1, having a light-sensitive silver halide dispersed therethrough.

2. A photographic element having at least one light-sensitive layer comprising a hydrophilic hydrolyzed ethylene/vinyl acetate interpolymer of mol ratio of 0.2 to 0.02 of ethylene to 1 of vinyl acetate, having a plurality of dye intermediate nuclei connected through aliphatic ether linkages to chain carbon atoms of said interpolymer, said nuclei possessing a structure of the formula:

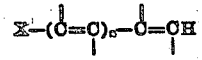

where X is a member of the group consisting of HO— and primary and secondary amino radicals and $n$ is a number from the group consisting of 0 and 1 and having light-sensitive silver halides dispersed therethrough.

3. A photographic element comprising a support having at least one light-sensitive layer comprising a hydrophilic ether of o-hydroxybenzyl alcohol of a hydrolyzed ethylene/vinyl acetate interpolymer of mol ratio of 0.2 to 0.02 of ethylene to 1 of vinyl acetate, said ether containing recurring units of the formula

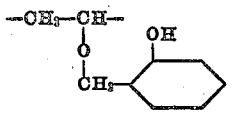

and said layer having light-sensitive silver halides dispersed therethrough.

4. A photographic element comprising a support having at least one light-sensitive layer comprising the hydrophilic (3-methyl-1-phenyl-5-pyrazolon-5-yl)methyl ether/benzaldehyde-o-sulfonic acid acetal of a hydrolyzed ethylene/vinyl acetate interpolymer having light-sensitive silver halides dispersed therethrough.

5. A photographic element comprising a support having at least one light-sensitive layer comprising a hydrophilic ether of a hydrolyzed ethylene/vinyl acetate interpolymer of mol ratio of 0.2 to 0.02 of ethylene to 1 of vinyl acetate, said ether containing recurring units of the formula

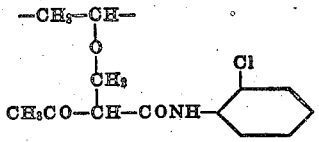

and said layer having light-sensitive silver halides dispersed therethrough.

DAVID W. WOODWARD.

REFERENCES CITED

The following references are of record in the file of this patent:

UNITED STATES PATENTS

| Number | Name | Date |
|---|---|---|
| 2,282,001 | Russell et al. | May 5, 1942 |
| 2,292,575 | Loleit | Aug. 11, 1942 |
| 2,310,943 | Dorough et al. | Feb. 16, 1943 |
| 2,330,291 | Kirby | Sept. 28, 1943 |
| 2,186,849 | Wilmanns | Jan. 9, 1940 |
| 2,186,733 | Schneider et al. | Jan. 9, 1940 |
| 2,297,732 | Woodward | Oct. 6, 1942 |
| 2,306,410 | Schinzel | Dec. 29, 1942 |
| 2,320,422 | Frohlich | June 1, 1943 |
| 2,286,215 | Lowe | June 16, 1942 |

FOREIGN PATENTS

| Number | Country | Date |
|---|---|---|
| 537,256 | British | June 16, 1941 |